G. JOHN.
BALL BEARING CONNECTING DEVICE FOR ROPES OR CABLES.
APPLICATION FILED OCT. 24, 1907.
1,064,225. Patented June 10, 1913.
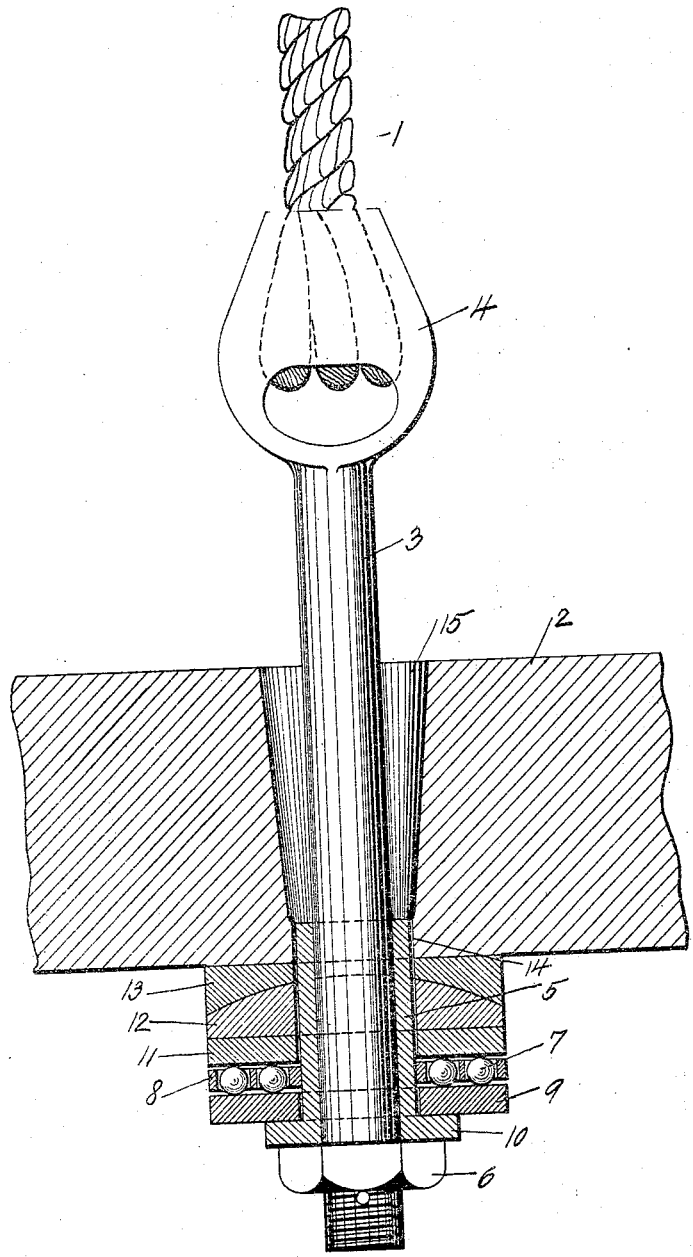

UNITED STATES PATENT OFFICE.

GRIFFITH JOHN, OF YONKERS, NEW YORK.

BALL-BEARING CONNECTING DEVICE FOR ROPES OR CABLES.

1,064,225.  Specification of Letters Patent.  Patented June 10, 1913.

Application filed October 24, 1907. Serial No. 398,937.

*To all whom it may concern:*

Be it known that I, GRIFFITH JOHN, a subject of the King of Great Britain, residing in Yonkers, in the county of Westchester and State of New York, have invented a new and useful Improvement in Ball-Bearing Connecting Devices for Ropes or Cables, of which the following is a specification.

My invention relates to an attaching device for ropes or cables, and is especially adapted for use with ropes or cables that are subjected to a twisting strain.

When a rope or cable in which the strands are twisted into spiral form is secured at one end and passes over a rotating pulley, there is a tendency for the rope or cable to twist, and the continual twisting and untwisting to which it is sometimes subjected reduces the life of the rope or cable and it is liable to break off close to its point of attachment.

An object of this invention is to increase the life of a rope or cable of this kind by providing a hitch or connection which will permit a free rotation of the rope, and thus offer but little resistance to its twisting and untwisting.

Other objects of the invention will appear hereinafter, the novel combinations of elements being set forth in the appended claims.

Referring to the drawing, which is a sectional elevation of a construction embodying my invention, 1 designates a rope or cable of any desired material, such as hemp, steel, iron, copper, brass, etc. This rope or cable is fastened to a beam or other member 2 by means of a thimble rod 3. The part 2 may be any stationary support to which the cable is secured, or it may be a movable member or support, as, for example, the overhead beam of an elevator car frame to which the end of the hoisting cable is ordinarily secured, or a counterweight frame in an elevator system.

A thimble or socket 4 integral in this instance with the thimble rod 3 serves as a holding device for the end of the rope or cable 1. If the cable be made of wire, it is preferred that the ends of the strands be untwisted or spread in the socket 4 and firmly secured by lead or solder.

A sleeve 5 is mounted on the lower portion of the rod 3 and held in position by a nut 6 threaded onto the lower end of the rod 3. The purpose of this sleeve is to prevent wear of the thimble rod on the cast iron block or other permanent support 2.

Roller bearings and rollers are provided which in this instance comprise steel balls 7, a cage 8 in which the balls are supported and guided, an upper steel bearing plate 11, and a lower steel disk or bearing plate 9, which latter rests on the flange 10 extending on the lower end of the sleeve 5. Interposed between the roller bearings and the block 2 are what are generally called "conical" or "equalizing" washers. These include a lower washer 12 resting on the plate 11 and having an upper convex surface, and an upper washer 13 whose lower surface is concave to fit the convex surface of washer 12. These surfaces are preferably of uniform curvature. If the pull on the cable 1 is at any time not exactly vertical or perpendicular to the bearing surface of the supporting member 2, the washer 12 will adapt itself so that the pressure on the ball bearings will always be evenly distributed. Clearances 14 and 15 are provided in the support 2 to permit free lateral movement of the thimble rod within predetermined limits. In the drawing I have shown an opening through the support 2 for the rod 3, the greater portion of which opening is conical to form the clearance or recess 15 and the remainder is substantially cylindrical to provide the clearance 14 for the upper portion of the sleeve 5.

Any twisting strain on the cable will be transmitted through the rod 3 and sleeve 5 to the bearing plate 9 which rests on the bearing balls 7 and which will rotate freely thereon in response to such twisting strain. The twisting tension on the cable is thus relieved and the twisting and untwisting of the cable and the consequent wear are avoided.

I wish not to be limited to the exact construction disclosed, as various changes in details of construction and arrangements of parts might be made by those skilled in the art without departing from the spirit and scope of my invention.

What I claim as new and desire to secure by Letters Patent of the United States is:—

1. The combination with a supported member, of a rod extending through said member, a sleeve on the extended end of the rod, a flange formed on the outer end of the sleeve, bearing washers, bearing rollers between the washers, and equalizing washers, said bearing washers and equalizing washers being mounted on the rod between the flange and said supported member.

2. In a connecting device, the combination of a supported member, a thimble rod extending through said member, a sleeve mounted on the extended end of the rod and extending between the rod and said member, a flange formed on the outer end of the sleeve, a nut threaded onto the rod and engaging the flange, bearing washers mounted on the sleeve, bearing balls between the washers, and equalizing washers mounted on the sleeve between the supported member and the bearing washers.

3. The combination with a rod, of bearing washers mounted on the rod, bearing balls between the washers, a supported member, and equalizing washers mounted on the rod between the supported member and bearing washers.

In testimony whereof, I have signed my name to this specification in the presence of two subscribing witnesses.

GRIFFITH JOHN.

Witnesses:
C. BLINN,
T. W. ALGAR GOLDY.

---

Copies of this patent may be obtained for five cents each, by addressing the "Commissioner of Patents, Washington, D. C."